(12) United States Patent
Kaplan et al.

(10) Patent No.: US 11,585,423 B2
(45) Date of Patent: Feb. 21, 2023

(54) COMPOSITE SPROCKET

(71) Applicant: ContiTech Antriebssysteme GmbH, Hannover (DE)

(72) Inventors: Jacob Kaplan, Omaha, NE (US); Christopher Ganshert, Lincoln, NE (US); Ben Roberts, Lincoln, NE (US)

(73) Assignee: ContiTech Antriebssysteme GmbH, Hannover (DE)

( * ) Notice: Subject to any disclaimer, the term of this patent is extended or adjusted under 35 U.S.C. 154(b) by 44 days.

(21) Appl. No.: 17/062,570

(22) Filed: Oct. 3, 2020

(65) Prior Publication Data
US 2022/0107014 A1 Apr. 7, 2022

(51) Int. Cl.
| | |
|---|---|
| *F16H 55/06* | (2006.01) |
| *B22D 19/00* | (2006.01) |
| *B29D 15/00* | (2006.01) |
| *F16H 55/17* | (2006.01) |

(52) U.S. Cl.
CPC ......... *F16H 55/06* (2013.01); *B22D 19/0036* (2013.01); *B29D 15/00* (2013.01); *F16H 55/171* (2013.01)

(58) Field of Classification Search
CPC .. F16H 55/06; F16H 55/171; F16H 2055/065; B22D 19/0036
See application file for complete search history.

(56) References Cited

U.S. PATENT DOCUMENTS

| | | | |
|---|---|---|---|
| 22,154 | A | 11/1858 | Barnard |
| 882,753 | A | 3/1908 | Grant |
| 1,903,776 | A | 4/1933 | Clark |
| 1,953,362 | A | 4/1934 | Murtaugh |
| 2,269,821 | A | 1/1942 | Kemphert |
| 2,704,793 | A | 3/1955 | Hanson |
| 2,710,762 | A | 6/1955 | Whitaker |
| 2,720,119 | A | 10/1955 | Sherman |
| 2,784,606 | A | 3/1957 | Schilling |
| 2,839,943 | A | 6/1958 | Caldwell |
| 2,938,757 | A | 5/1960 | Pieper |
| 3,083,583 | A | 4/1963 | Reinhold |
| 3,117,460 | A | 1/1964 | Traeger |
| 3,180,171 | A | 4/1965 | Arpin |
| 3,226,995 | A | 1/1966 | Getz et al. |

(Continued)

FOREIGN PATENT DOCUMENTS

| | | |
|---|---|---|
| DE | 202014100830 U1 | 4/2014 |
| DE | 112013003955 T5 | 4/2015 |

(Continued)

OTHER PUBLICATIONS

International Search Report dated Jan. 14, 2022 of International Search Report PCT/EP2021/076316 on which is claiming priority to this application.

*Primary Examiner* — Terence Boes
(74) *Attorney, Agent, or Firm* — Gregory Adams; David L. Cate (57) ABSTRACT

One general aspect includes a composite sprocket. The composite sprocket also includes a skeleton having a connection interface and an outer portion having a rough tooth structure. The composite sprocket also includes an overlay formed on and over the outer portion of the skeleton and may include of a precision material and forming a high precision tooth structure over the rough tooth structure.

15 Claims, 5 Drawing Sheets

(56) References Cited

U.S. PATENT DOCUMENTS

| | | | |
|---|---|---|---|
| 3,241,391 A | 3/1966 | Borro et al. |
| 3,367,199 A | 2/1968 | Dankowski |
| 3,638,974 A | 2/1972 | Stratienko |
| 3,651,705 A | 3/1972 | Bertinetti et al. |
| 3,738,691 A | 6/1973 | Firth |
| 3,744,330 A | 7/1973 | Sugimoto |
| 3,756,091 A | 9/1973 | Miller |
| 3,870,379 A | 3/1975 | Payne |
| 3,924,481 A | 12/1975 | Gregg |
| 3,969,946 A | 7/1976 | Gregg |
| 3,975,965 A | 8/1976 | Speer |
| 3,999,445 A * | 12/1976 | Liautaud ............ B29C 45/14778 29/893.3 |
| 4,002,081 A | 1/1977 | Schultz, Jr. |
| 4,037,485 A | 7/1977 | Hoback |
| 4,041,789 A | 8/1977 | Hoback |
| 4,070,920 A | 1/1978 | LeBlanc |
| 4,103,558 A | 8/1978 | Peabody et al. |
| 4,218,932 A | 8/1980 | McComber |
| 4,233,852 A | 11/1980 | Bruns |
| 4,337,056 A | 6/1982 | Bruns |
| 4,365,964 A | 12/1982 | Krome, Jr. |
| 4,366,609 A | 1/1983 | Speer |
| 4,403,979 A | 9/1983 | Wujick |
| 4,418,179 A | 11/1983 | DeWitt et al. |
| 4,427,403 A | 1/1984 | Kanamori et al. |
| 4,468,211 A | 8/1984 | Hoshiro et al. |
| 4,514,179 A | 4/1985 | Skura |
| 4,515,577 A | 5/1985 | Cathey et al. |
| 4,570,786 A | 2/1986 | Morrison |
| 4,586,915 A | 5/1986 | Cathey et al. |
| 4,604,080 A | 8/1986 | Mizuno |
| 4,605,389 A | 8/1986 | Westhoff |
| 4,670,508 A | 6/1987 | Ohdaira et al. |
| 4,717,370 A | 1/1988 | Rohrig |
| 4,950,211 A | 8/1990 | James |
| 4,988,231 A | 1/1991 | Pettit |
| 4,991,993 A | 2/1991 | Watlington et al. |
| 5,046,993 A | 9/1991 | Macchiarulo et al. |
| 5,059,464 A | 10/1991 | Mikuni |
| 5,074,828 A | 12/1991 | Ellis |
| 5,098,346 A * | 3/1992 | Redmond ............ F16H 55/171 474/161 |
| 5,131,731 A | 7/1992 | Johnson |
| 5,145,188 A | 9/1992 | Bartelt et al. |
| 5,201,635 A | 4/1993 | Steinmetz |
| RE34,485 E | 12/1993 | Tanaka et al. |
| 5,292,584 A | 3/1994 | Howard et al. |
| 5,304,101 A | 4/1994 | Baer |
| 5,435,784 A | 7/1995 | Mark |
| 5,441,458 A | 8/1995 | Us |
| 5,852,951 A | 12/1998 | Santi |
| 5,908,591 A | 6/1999 | Lewit et al. |
| 5,931,755 A | 8/1999 | Mailey et al. |
| 5,934,447 A | 8/1999 | Kanaris |
| 5,961,412 A | 10/1999 | Takahashi |
| 6,176,797 B1 | 1/2001 | Vine |
| 6,254,371 B1 | 7/2001 | McNally et al. |
| 6,485,384 B1 | 11/2002 | Ochiai et al. |
| 6,591,708 B2 | 7/2003 | Kobayashi et al. |
| 6,767,491 B2 * | 7/2004 | Kurokawa ............ B29C 70/345 264/153 |
| 6,976,921 B2 | 12/2005 | Mehlan et al. |
| 7,698,964 B2 | 4/2010 | Kashimura |
| 7,814,809 B2 | 10/2010 | Shinohara |
| 7,887,446 B2 | 2/2011 | Hironaka |
| 7,967,709 B2 | 6/2011 | Emura et al. |
| 3,070,634 A1 | 12/2011 | Gaynor |
| 8,312,959 B1 | 11/2012 | Schneider et al. |
| 8,822,753 B2 | 9/2014 | Shiraishi et al. |
| 9,360,099 B2 | 6/2016 | Wang |
| 9,670,985 B2 | 6/2017 | Sekiguchi et al. |
| 9,950,768 B2 | 4/2018 | Osaki et al. |
| 2002/0043124 A1 | 4/2002 | Shiga et al. |
| 2003/0195072 A1 | 10/2003 | Redmond |
| 2006/0254548 A1 | 11/2006 | Dec et al. |
| 2006/0264286 A1 | 11/2006 | Hodjat |
| 2007/0021558 A1 | 1/2007 | Shinohara et al. |
| 2007/0202332 A1 | 8/2007 | Gunnewig et al. |
| 2008/0014602 A1 | 1/2008 | Nagano et al. |
| 2008/0146402 A1 | 6/2008 | Shinohara |
| 2011/0250070 A1 | 10/2011 | Demtroder |
| 2013/0260624 A1 | 10/2013 | Rastigi et al. |
| 2014/0023817 A1 | 1/2014 | Kaushik et al. |
| 2014/0102387 A1 | 4/2014 | Taylor et al. |
| 2014/0227548 A1 | 8/2014 | Myrick |
| 2014/0243466 A1 | 8/2014 | Sinha et al. |
| 2015/0219203 A1 | 8/2015 | Pflug et al. |
| 2016/0016368 A1 | 1/2016 | Kunishima |
| 2016/0090453 A1 | 3/2016 | Mathur et al. |
| 2016/0114544 A1 | 4/2016 | Kunishima |
| 2016/0363206 A1 | 12/2016 | Modrzejewski et al. |
| 2017/0197676 A1 * | 7/2017 | Weckbecker ......... B62D 55/125 |
| 2017/0226242 A1 | 8/2017 | Smeets et al. |
| 2018/0259043 A1 | 9/2018 | Pease et al. |
| 2018/0274642 A1 | 9/2018 | Liu et al. |
| 2019/0085939 A1 | 3/2019 | Matsukawa |
| 2019/0277384 A1 | 9/2019 | Feuerborn et al. |

FOREIGN PATENT DOCUMENTS

| | | |
|---|---|---|
| EP | 0106694 A1 | 4/1984 |
| EP | 1176083 A1 | 1/2002 |
| EP | 1884540 A1 | 2/2008 |
| EP | 3015257 A1 | 5/2016 |
| JP | S58128562 A | 8/1983 |
| JP | H07180747 A | 7/1995 |
| JP | 2000320626 A | 11/2000 |
| JP | 2001065648 A | 3/2001 |
| JP | 2002039329 A | 2/2002 |
| JP | 2006153249 A | 6/2006 |
| JP | 2014141048 A | 8/2014 |
| JP | 2015502285 A | 1/2015 |
| KR | 20070120194 A | 12/2007 |
| WO | 2013070404 A2 | 5/2013 |
| WO | 2014024377 A1 | 2/2014 |
| WO | 2015029840 A1 | 3/2015 |

* cited by examiner

COMPOSITE SPROCKET

FIELD

The field to which the disclosure generally relates is belt sprockets and their construction and includes composite sprockets used with belts and having precision teeth.

BACKGROUND

This section provides background information to facilitate a better understanding of the various aspects of the disclosure. It should be understood that the statements in this section of this document are to be read in this light, and not as admissions of prior art.

Sprockets typically include a plurality of teeth that are arranged in alternating fashion with groves. The teeth and grooves extend about an entire outer circumference of the sprocket. A toothed belt engages the toothed surface. Conventional sprockets for high torque applications are made of iron or steel. Often the sprocket is affixed onto a shaft with a bushing. The use of a bushing allows a sprocket to be installed on many different shaft sizes. Two common types of bushings are quick disconnect (QD) and Taper-Lock. Both of these bushing types use a tapered interface between the sprocket hub and bushing which generates large hub forces in the sprocket in order to clamp onto the shaft.

Synchronous belts and pulleys are commonly offered in standard pitch sizes of 5, 8, 14, and 20 mm. There are some offerings of non-metal pulleys in the 5 and 8 mm pitch sizes. These are typically made of nylon molded to an aluminum or steel hub with a straight bore and set screw for attaching to a shaft. However, such pulleys are not adequately durable for high torque applications, many of which require the larger pitch sizes. Also, in some cases, synchronous pulleys made of other materials than steel can have wear issues and have the teeth erode, wear out and fail.

Metal sprockets generally require high precision for proper operation. This high precision is costly to implement. In one example, a high cost finishing step is required to modify the sprocket to appropriate tolerances.

Thus, there is an ongoing need for lower cost techniques to provide high precision sprockets that retain strength and resilience, such needs met, at least in part, with embodiments according to the following disclosure.

DETAILED DESCRIPTION

The following description of the variations is merely illustrative in nature and is in no way intended to limit the scope of the disclosure, its application, or uses. The description is presented herein solely for the purpose of illustrating the various embodiments of the disclosure and should not be construed as a limitation to the scope and applicability of the disclosure. In the summary of the disclosure and this detailed description, each numerical value should be read once as modified by the term "about" (unless already expressly so modified), and then read again as not so modified unless otherwise indicated in context. Also, in the summary of the disclosure and this detailed description, it should be understood that a value range listed or described as being useful, suitable, or the like, is intended that any and every value within the range, including the end points, is to be considered as having been stated. For example, "a range of from 1 to 10" is to be read as indicating each and every possible number along the continuum between about 1 and about 10. Thus, even if specific data points within the range, or even no data points within the range, are explicitly identified or refer to only a few specific, it is to be understood that inventors appreciate and understand that any and all data points within the range are to be considered to have been specified, and that inventors had possession of the entire range and all points within the range.

Unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of concepts according to the disclosure. This description should be read to include one or at least one and the singular also includes the plural unless otherwise stated.

The terminology and phraseology used herein is for descriptive purposes and should not be construed as limiting in scope. Language such as "including," "comprising," "having," "containing," or "involving," and variations thereof, is intended to be broad and encompass the subject matter listed thereafter, equivalents, and additional subject matter not recited.

Also, as used herein any references to "one embodiment" or "an embodiment" means that a particular element, feature, structure, or characteristic described in connection with the embodiment is included in at least one embodiment. The appearances of the phrase "in one embodiment" in various places in the specification are not necessarily referring to the same embodiment.

The foregoing description of the embodiments has been provided for purposes of illustration and description. Example embodiments are provided so that this disclosure will be sufficiently thorough, and will convey the scope to those who are skilled in the art. Numerous specific details are set forth such as examples of specific components, devices, and methods, to provide a thorough understanding of embodiments of the disclosure, but are not intended to be exhaustive or to limit the disclosure. It will be appreciated that it is within the scope of the disclosure that individual elements or features of a particular embodiment are generally not limited to that particular embodiment, but, where applicable, are interchangeable and can be used in a selected embodiment, even if not specifically shown or described.

The same may also be varied in many ways. Such variations are not to be regarded as a departure from the disclosure, and all such modifications are intended to be included within the scope of the disclosure.

Also, in some example embodiments, well-known processes, well-known device structures, and well-known technologies are not described in detail. Further, it will be readily apparent to those of skill in the art that in the design, manufacture, and operation of apparatus to achieve that described in the disclosure, variations in apparatus design, construction, condition, erosion of components, gaps between components may present, for example.

Sprockets typically include a plurality of teeth that are arranged in alternating fashion with groves. The teeth and grooves extend about an entire outer circumference of the sprocket. A toothed or ribbed belt engages the toothed surface. Typical sprockets for high torque applications are generally made of iron or steel. Often the sprocket is affixed onto a shaft with a bushing. The use of a bushing allows a sprocket to be installed on many different shaft sizes. Two common types of bushings are quick disconnect (QD) and Taper-Lock. Both of these bushing types use a tapered interface between the sprocket hub and bushing which generates large hub forces in the sprocket in order to clamp onto the shaft. It is appreciated that other interfaces/connections in addition to or instead of a bushing are contemplated.

Synchronous belts and pulleys are commonly offered in standard pitch sizes of 5, 8, 14, and 20 mm. There are some offerings of non-metal pulleys in the 5 and 8 mm pitch sizes. These are typically made of nylon molded to an aluminum or steel hub with a straight bore and set screw for attaching to a shaft. However, such pulleys are not adequately durable for high torque applications, many of which require the larger pitch sizes. Also, in some cases, synchronous pulleys made of other materials than steel can have wear issues and have the teeth erode, wear out and fail.

Thus, there is an ongoing need for efficiently and/or low cost manufactured sprockets and the like that retain suitable tooth strength for high torque applications, such needs met, at least in part, with embodiments according to the following disclosure.

One or more embodiments are disclosed that include a composite sprocket having a rough or high tolerance skeleton combined with a fine detail and/or low tolerance overlay.

Figure 1:
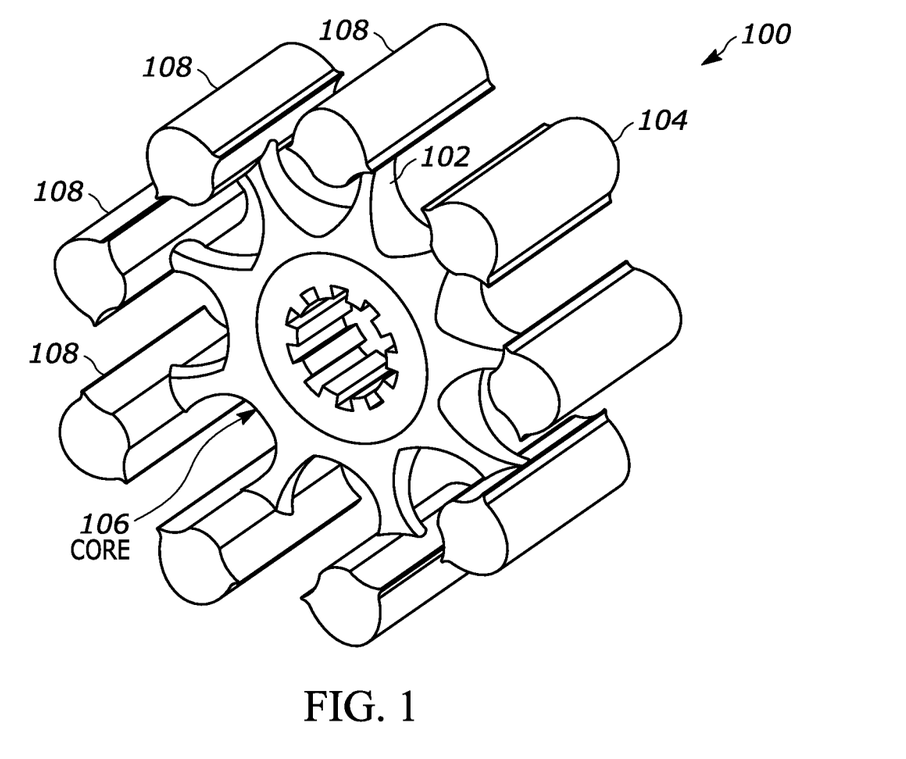
FIG. 1 is a diagram illustrating a composite sprocket 100 in accordance with one or more embodiments.

FIG. 1 is a diagram illustrating a composite sprocket 100 in accordance with one or more embodiments. It is appreciated that the sprocket 100 is provided for illustrative purposes and that suitable variations are contemplated.

The sprocket 100 is a high torque sprocket and can also be referred to as a gear. The sprocket includes a body or skeleton 102 and an overlay 104. The sprocket 100 is further defined by a core/hub 106 and teeth 108.

The sprocket 100 is generally used for high torque and/or load applications, such as loads of 200 horse power (HP) or more. In one example, the sprocket 100 is 8 mm pitch, formed of cast iron and operates with a load of 84 HP.

The sprocket 100 has a relatively high tensile strength. For example, the sprocket 100 can have a tensile strength of greater than about 9,0000 psi. In another example, the sprocket 100 has a tensile strength greater than a tensile strength of urethane.

The hub 106 is an interface that connects to a shaft or other device. It is appreciated that other interfaces, such as a hexagonal shaft with a clamping collar, a keyway with a tapered key, splines, bearings, shrink-fits, bolted connections and the like are contemplated.

The skeleton 102 is comprised of a high strength material, typically a metal, such as iron, steel and the like. However, it is appreciated that other suitable materials can be used. The skeleton 102, in one example, is formed by rough or sand casting without metal finishing. In another example, the skeleton 102 is formed of extruded aluminum.

The overlay 104 is comprised of a precision material, such as urethane, plastic, elastomeric and the like materials. The overlay 104 is formed with a relatively fine detail. In one example, the overlay is formed on/over the skeleton 102 using a castable material formed of a castable polymer material, and in some aspects, may be essentially free or devoid of any metal structure, or structures.

The precision material is a material that can be formed, such as molded or cast, on/over the skeleton 102 with suitable tolerances without finishing or post processing after formation. Examples of suitable precision materials include urethane, plastics/polymers, rubber, elastomeric materials, and the like.

In one example, the skeleton 102 has low precision and/or high tolerances of plus or minus 0.030 inches and the overlay 104 has high precision and/or low tolerances of plus or minus 0.003 inches.

In an example using cast iron for the skeleton 102, sand casting techniques can be used that result in low precision and/or high tolerances of plus or minus 0.060 inches. In another example for cast iron, sand casting techniques can be used that result in low precision and/or high tolerances of plus or minus 0.015 inches.

In an example for the overlay 104, the overlay 104 has high precision and/or low tolerances of plus or minus 0.003 inches when cast as urethane. In another example, the overlay 104 has high precision and/or low tolerances of plus or minus 0.010 inches when cast as urethane. In yet another example, the overlay 104 has high precision and/or low tolerances of plus or minus 0.009 inches.

The teeth 108, also referred to as a toothed structure, are disposed around an outer periphery of the sprocket 100. The teeth 108 include an inner portion and an outer portion. The inner portion is part of the skeleton/body 102 and the outer portion is part of the overlay 104. The teeth 108 interact with teeth/ribs of a belt.

Insufficient precision of the teeth can cause a variety of issues, such as undesirable rubbing between a belt and the sprocket as a belt tooth engages a sprocket tooth. This can create excessive wear on the sprocket teeth and/or the belt. Another issue that can result is that improper pitching does not correctly distribute a load across engaged teeth of the sprocket. This causes excess tooth loading and can lead to tooth shear. Yet another issue is that the belt tooth may not be properly supported, causing the load to be concentrated between belt teeth. This can damage belt cords and lead to a loss of tensile life of the belt. Another issue is improper tracking which causes a belt to track to one side or the other. This concentrates the load to one edge of a belt and can cause excessive wear to that edge. It is appreciated that other undesirable issues can result from insufficient precision of the sprocket teeth.

The overlay 104 can also be formed over the hub/interface 106 to form a high precision mating feature for connecting the sprocket 100 to a shaft and/or the like. It is appreciated that the lack of a high precision mating feature can result in undesirable issues, such as hub slippage, generation of excess heat and the like.

Figure 2:
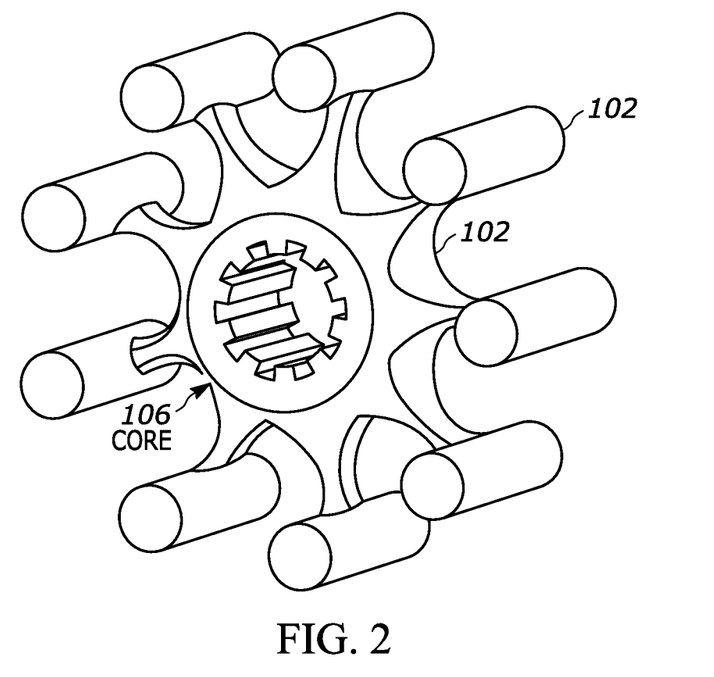
FIG. 2 is a diagram illustrating the skeleton 102 of the sprocket 100 in accordance with one or more embodiments.

FIG. 2 is a diagram illustrating the skeleton 102 of the sprocket 100 in accordance with one or more embodiments.

It is appreciated that the skeleton 102 is provided for illustrative purposes and that suitable variations are contemplated.

The skeleton/body 102 is comprised of a high strength material, as described above.

The overlay 104 is not shown for illustrative purposes.

Figure 3:
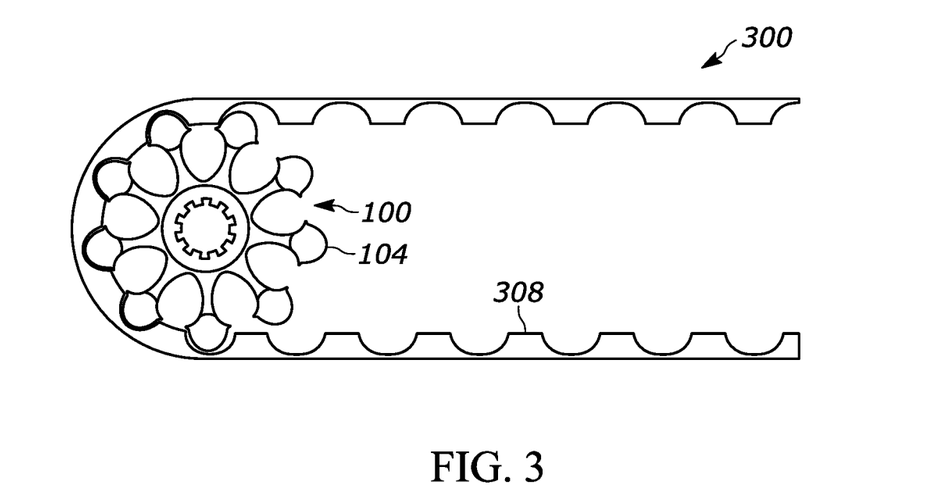
FIG. 3 is a diagram illustrating a belt system 300 in accordance with one or more embodiments.

FIG. 3 is a diagram illustrating a belt system 300 in accordance with one or more embodiments. It is appreciated that the system 300 is provided for illustrative purposes and that suitable variations are contemplated.

The system 300 includes a belt 308 that moves about/around the sprocket 100.

The belt 308 includes a plurality of ribs on an inner surface.

The teeth 108 of the sprocket 100 are configured to engage the ribs to cause continuous, reliable movement of the belt 308. The overlay 104 is configured to precisely engage the ribs and mitigate vibration and noise.

Figure 4:
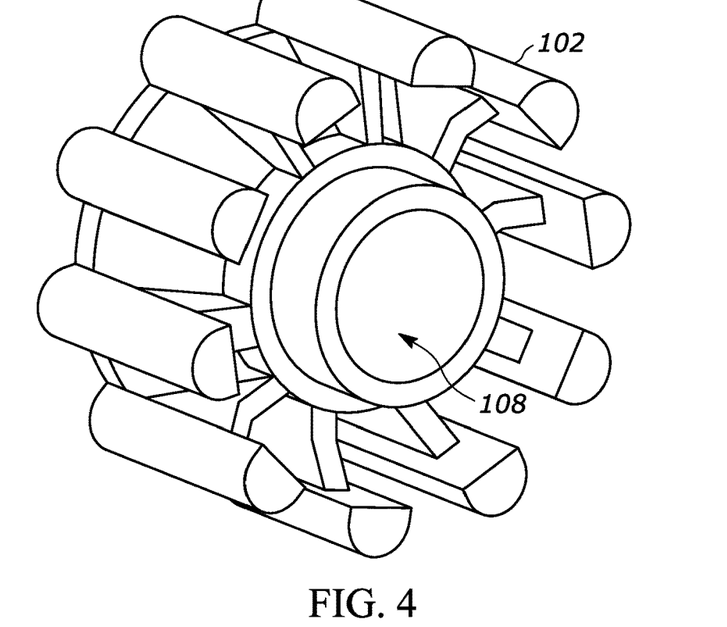
FIG. 4 is a diagram illustrating a sprocket 400 in accordance with one or more embodiments.

FIG. 4 is a diagram illustrating a sprocket 400 in accordance with one or more embodiments. It is appreciated that the sprocket 400 is provided for illustrative purposes and that suitable variations are contemplated.

The sprocket 400 is similar to the sprocket 100 described above, however the sprocket 400 has a different size and/or shape.

The sprocket 400 includes the skeleton 102 and a hub 108.

Figure 5:
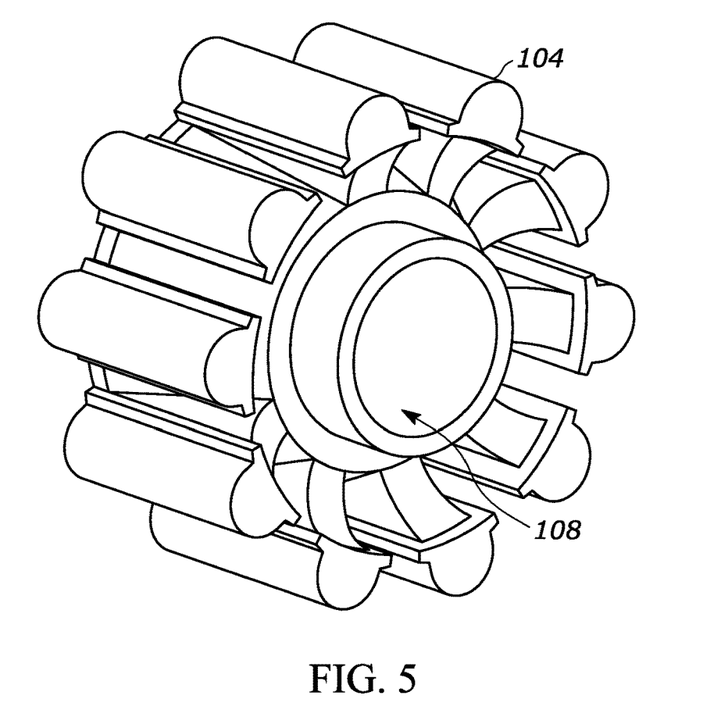
FIG. 5 is a diagram illustrating the sprocket 400 in accordance with one or more embodiments.

FIG. 5 is a diagram illustrating the sprocket 400 in accordance with one or more embodiments. It is appreciated that the sprocket 400 is provided for illustrative purposes and that suitable variations are contemplated.

The overlay 104 is shown formed on/over the skeleton 102.

Figure 6:
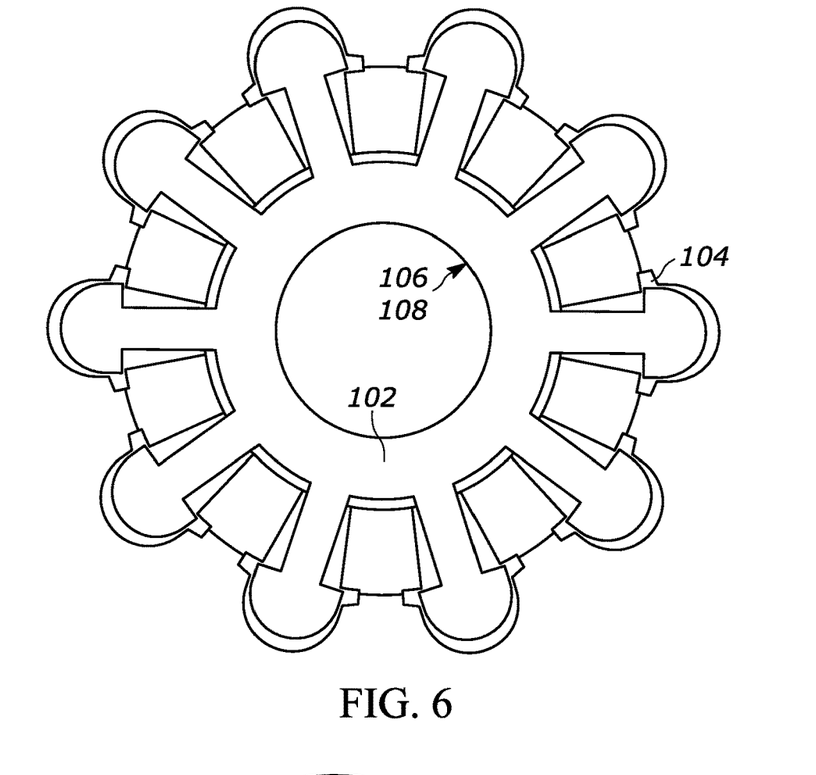
FIG. 6 is a diagram illustrating the sprocket 400 in accordance with one or more embodiments.

FIG. 6 is a diagram illustrating the sprocket 400 in accordance with one or more embodiments. It is appreciated that the sprocket 400 is provided for illustrative purposes and that suitable variations are contemplated.

This view shows an opposite end from the view shown in FIG. 5.

The covering of the skeleton/body 102 by the overlay 104 is shown.

Figure 7:
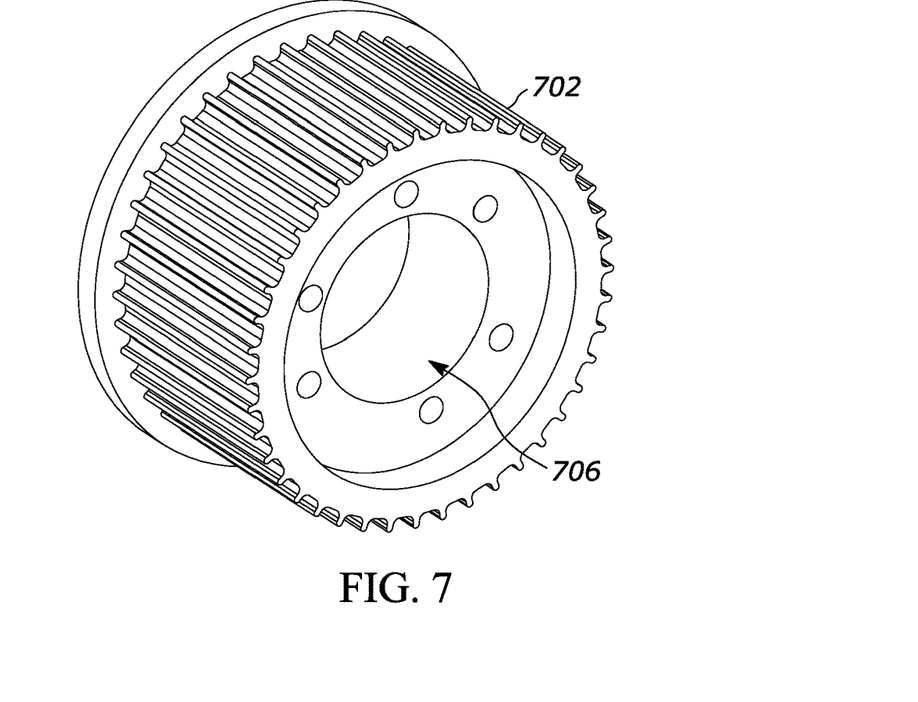
FIG. 7 is a diagram illustrating a sprocket 700 in accordance with one or more embodiments.

FIG. 7 is a diagram illustrating a sprocket 700 in accordance with one or more embodiments. It is appreciated that the sprocket 700 is provided for illustrative purposes and that suitable variations are contemplated.

The sprocket 700 is similar to the sprocket 100 described above, however the sprocket 700 has a different size and/or shape.

The sprocket 700 includes a skeleton 702 and a hub 706. The skeleton 702 is comprised of a high strength material, typically a metal, such as iron, steel and the like. However, it is appreciated that other suitable materials can be used. The skeleton 102, in one example, is formed by rough casting without metal finishing.

Figure 8:
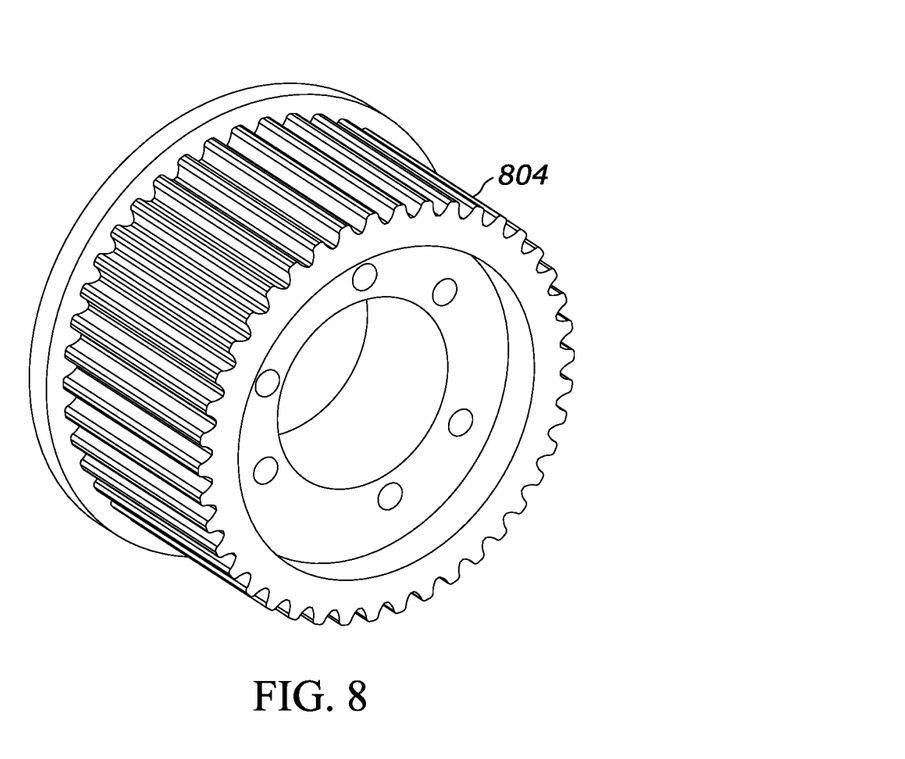
FIG. 8 is a diagram illustrating the sprocket 700 in accordance with one or more embodiments.

FIG. 8 is a diagram illustrating the sprocket 700 in accordance with one or more embodiments. It is appreciated that the sprocket 700 is provided for illustrative purposes and that suitable variations are contemplated.

An overlay 804 is shown formed on/over the skeleton 702. The overlay 804 is comprised of a precision material, such as urethane, plastic, elastomeric and the like materials. The overlay 104 is formed with a relatively fine detail. In one example, the overlay is formed on/over the skeleton 102 using a castable material formed of a castable polymer material, and in some aspects, may be essentially free or devoid of any metal structure, or structures.

Figure 9:
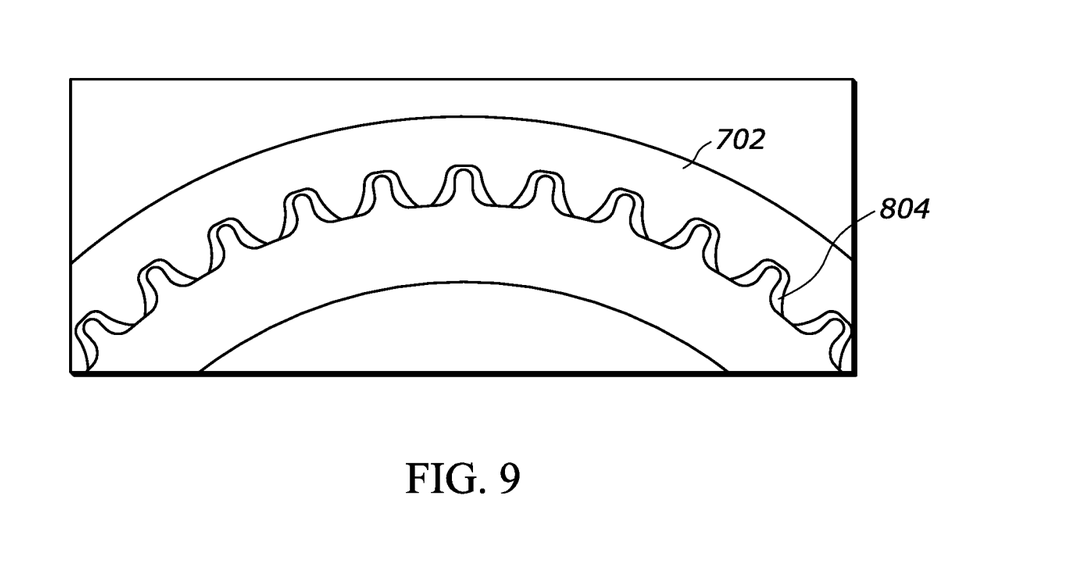
FIG. 9 is a diagram illustrating the sprocket 700 in accordance with one or more embodiments.

FIG. 9 is a diagram illustrating the sprocket 700 in accordance with one or more embodiments. It is appreciated that the sprocket 700 is provided for illustrative purposes and that suitable variations are contemplated.

The covering of the skeleton/body 702 by the overlay 804 is shown in a tooth section.

It is noted that 'having' does not exclude other elements or steps and 'one' or 'one' does not exclude a multitude. It should also be noted that characteristics described with reference to one of the above examples of execution can also be used in combination with other characteristics of other examples of execution described above. Reference signs in the claims are not to be regarded as a restriction.

Spatially relative terms, such as "inner", "adjacent", "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

One general aspect includes a composite sprocket. The composite sprocket also includes a skeleton having a connection interface and an outer portion having a rough tooth structure. The composite sprocket also includes an overlay formed on and over the outer portion of the skeleton and may include of a precision material and forming a high precision tooth structure over the rough tooth structure.

Implementations may include one or more of the following features. The sprocket where the skeleton is may include of a castable metal material. The skeleton is may include of iron and is formed by a rough casting without metal finishing. The skeleton is may include of extruded aluminum. The precision material of the overlay is a castable polymer material. The precision material of the overlay is a castable urethane. The connection interface is a hub is configured with a mating feature to facilitate rotational movement of the sprocket about an axis. The overlay is further configured to cover an inner surface of the hub to form a high precision mating feature. The overlay material contains a textile reinforcement material. The skeleton has a tensile strength greater than about 9,000 psi. The skeleton has tolerances of greater than about plus or minus 0.030 inches. The overlay has tolerances of less than about plus or minus 0.010 inches. The sprocket is configured to rotate about a center axis and move a belt, where the high precision tooth structure engages ribs of the belt.

One general aspect includes a composite sprocket. The composite sprocket also includes a skeleton having a connection interface and an outer portion having a rough tooth structure, where the connection interface and the rough tooth structure have a first tolerance. The composite sprocket also includes an overlay formed on and over the outer portion of the skeleton and forming a high precision tooth structure over the rough tooth structure, the high precision tooth structure have a second tolerance greater than the first tolerance.

Implementations may include one or more of the following features. The sprocket where the skeleton having a first tensile strength and the overlay has a second tensile strength, then the first tensile strength is greater than the second tensile strength. In one example the first tensile strength is greater than about 9,000 psi and the second tensile strength is less than about 9,000 psi. The skeleton material may be cast iron with first tensile strength of 60,000 psi and the overlay may be a castable polymer with a second tensile strength of 9,000 psi.

One general aspect includes a method of forming a composite sprocket. The method also includes forming a sprocket skeleton having a connection interface and an outer portion having a rough tooth structure by casting a metal material using a mold. The method also includes removing the sprocket skeleton from the mold. The method also includes forming an overlay on at least the outer portion of the sprocket skeleton with a high precision material to form a high precision tooth structure over the rough tooth structure.

Although a few embodiments of the disclosure have been described in detail above, those of ordinary skill in the art will readily appreciate that many modifications are possible without materially departing from the teachings of this disclosure. Accordingly, such modifications are intended to be included within the scope of this disclosure as defined in the claims.

What is claimed is:

1. A composite sprocket comprising:
    a skeleton having a connection interface and an outer portion having a rough tooth structure;
    an overlay formed on and over the outer portion of the skeleton and comprised of a precision material and forming a high precision tooth structure over the rough tooth structure;
    the skeleton formed having a low precision with tolerances of plus or minus 0.060 inches;
    the overlay formed having the high precision with tolerances of plus or minus 0.015 inches;
    the connection interface is a hub is configured with a mating feature to facilitate rotational movement of the sprocket about an axis;
    the overlay is further configured to cover an inner surface of the hub to form a high precision mating feature.

2. The sprocket of claim 1, wherein the skeleton is comprised of a castable metal material.

3. The sprocket of claim 1, wherein the skeleton is comprised of iron and is formed by a rough casting without metal finishing.

4. The sprocket of claim 1, wherein the skeleton is comprised of extruded aluminum.

5. The sprocket of claim 1, wherein the precision material of the overlay is a castable polymer material.

6. The sprocket of claim 1, wherein the precision material of the overlay is a castable urethane.

7. The sprocket of claim 1, wherein the overlay material contains a textile reinforcement material.

8. The sprocket of claim 1, wherein the skeleton has a tensile strength greater than about 9,000 psi.

9. The sprocket of claim 1, wherein the sprocket is configured to rotate about a center axis and move a belt, where the high precision tooth structure engages ribs of the belt.

10. A composite sprocket comprising:
    a skeleton having a connection interface and an outer portion having a rough tooth structure, wherein the connection interface and the rough tooth structure have a first tolerance; and
    an overlay formed on and over the outer portion of the skeleton and forming a high precision tooth structure over the rough tooth structure, the high precision tooth structure have a second tolerance and the overlay configured to cover an inner surface of a hub to form a high precision mating feature;
    the first tolerance is greater than about plus or minus 0.030 inches;
    the second tolerance is less than about plus or minus 0.010 inches.

11. The sprocket of claim 10, wherein the skeleton have a first tensile strength and the overlay has a second tensile strength, then the first tensile strength is greater than the second tensile strength.

12. The sprocket of claim 11, wherein the first tensile strength is greater than about 9,000 psi and the second tensile strength is less than about 6,600 psi.

13. The sprocket of claim 11, wherein the skeleton is comprised of cast iron.

14. The sprocket of claim 11, wherein the skeleton is comprised of iron and the first tensile strength is about 65.5 to 172 Mega pascals (Mpa) tensile strength, yield.

15. A composite sprocket comprising:
    a skeleton having a hub and an outer portion having a rough tooth structure; and
    an overlay formed on and over the outer portion of the skeleton and comprised of a precision material and forming a high precision tooth structure over the rough tooth structure;
    the hub is configured with a mating feature to facilitate rotational movement of the sprocket about an axis
    the skeleton is comprised of iron and is formed by a rough casting without metal finishing;
    the precision material of the overlay is a castable urethane;
    the skeleton formed having a low precision with tolerances of plus or minus 0.060 inches;
    the overlay formed having the high precision with tolerances of plus or minus 0.015 inches;
    the skeleton has a tensile strength of about 65.5 to 172 Mega pascals (Mpa) tensile strength, yield;
    the overlay has a tensile strength less than about 6,600 psi;
    the tooth structure comprising 9 teeth;
    the overlay configured to cover an inner surface of the hub to form a high precision mating feature.

* * * * *